T. V. BUCKWALTER.
BATTERY SUPPORTING MECHANISM.
APPLICATION FILED JAN. 20, 1909.

929,118.

Patented July 27, 1909.
2 SHEETS—SHEET 1.

WITNESSES:

INVENTOR
Tracy V. Buckwalter
by Charles N. Butler
ATTORNEY.

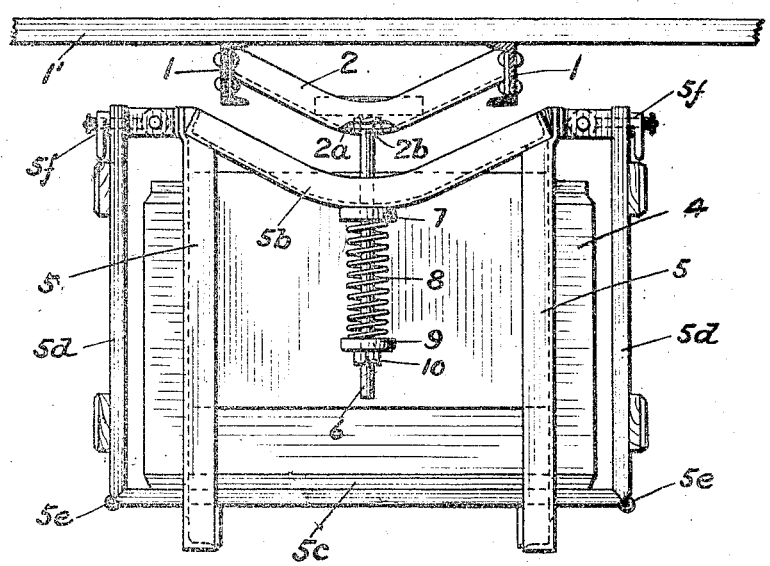

UNITED STATES PATENT OFFICE.

TRACY V. BUCKWALTER, OF ALTOONA, PENNSYLVANIA.

BATTERY-SUPPORTING MECHANISM.

No. 929,118.  Specification of Letters Patent.  Patented July 27, 1909.

Application filed January 20, 1909. Serial No. 473,225.

*To all whom it may concern:*

Be it known that I, TRACY V. BUCKWALTER, a citizen of the United States, residing in the city of Altoona, county of Blair, and State of Pennsylvania, have invented certain Improvements in Battery-Supporting Mechanism.

My invention is a battery supporting mechanism comprising a cradle provided with an elastic three point rocking suspension for the purpose of protecting batteries by the absorption of vibrations, jars and the effects of sudden or irregular movements, particularly of vehicles, trucks and cars carrying such batteries.

A contemplated use of my improvements is in connection with baggage trucks driven by motors operated by storage batteries, where, by the mechanism which I have provided, the batteries are cushioned and balanced so that vibrations, jars and irregular movements communicated to the trucks are absorbed or neutralized.

Figure 1:
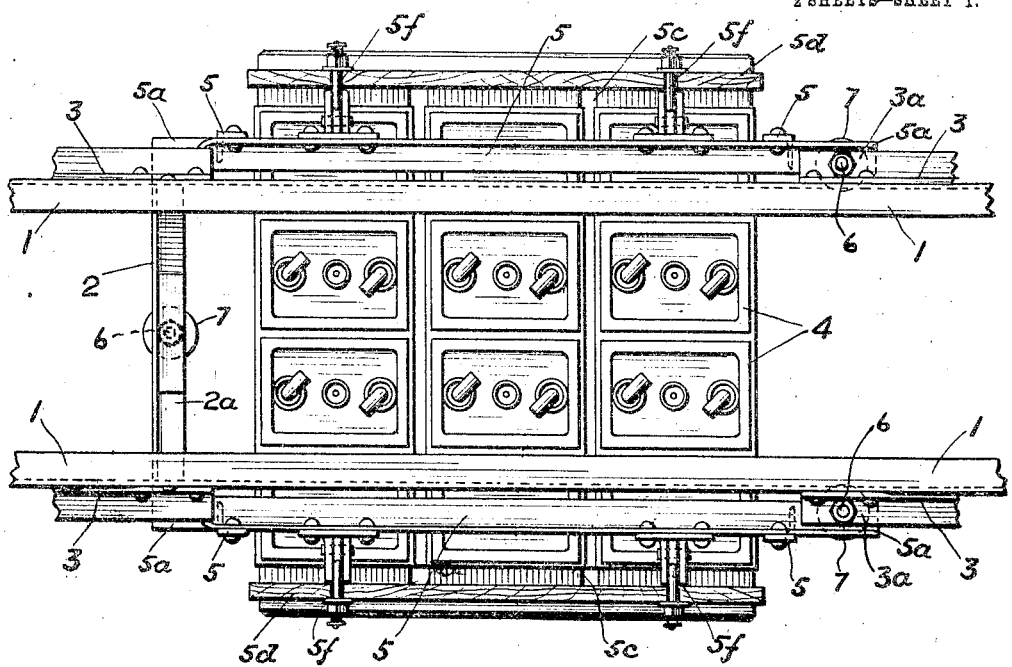
Figure 2:
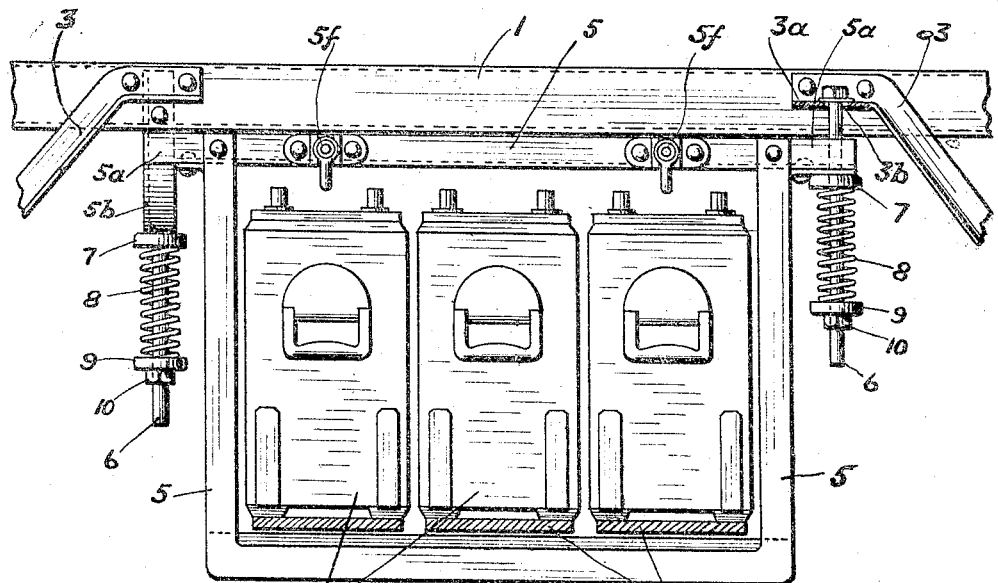

In the drawings representing my improvements, Figure 1 is a plan view representing a battery having a casing suspended from three points of a truck frame; Fig. 2 is a sectional side elevation of the same; Fig. 3 is an elevation of one end of the construction; and Fig. 4 is an elevation of the other end thereof.

As illustrated, the frame for holding the battery comprises the longitudinal channel bars 1 fixed to the under side of the truck platform 1', the downwardly bent cross bar 2 disposed between and fixed to the bars 1, and the struts 3 fixed to the bars 1. The cross bar 2 is suitably of angle iron with a horizontally disposed flange $2^a$ containing a hole $2^b$, and the struts 3 are suitably of angle iron with the horizontally disposed flanges $3^a$, in two of which are holes $3^b$. The cradle or frame for holding the battery 4 comprises the rigid rectangular frame members 5 having the projections or lugs $5^a$ extending in parallel directions from the upper corners thereof, and connecting two similarly disposed projections of the parallel frame members is a downwardly bent cross bar $5^b$. Within the frame members 5 is the battery casing or crate $5^c$ having doors $5^d$, the latter being carried by the hinges $5^e$ and held closed by the latches $5^f$. Bolts 6 pass through the holes $2^b$ and $3^b$ of the parts $2^a$ and $3^a$, which engage the bolt heads, and through similar holes in the parts $5^a$ and $5^b$, the several holes being made larger than the bolt shanks so that the bolts are free to oscillate universally. Washers or disks 7 are sleeved on the bolts 6 to afford bearings for the parts $5^a$ and $5^b$ and on the bolts beneath the washers are placed the coiled springs 8 which are supported by the washers or disks 9 and nuts 10. The three elastic or resilient hangers, thus provided by the bolts and springs, have three points of support and three points of engagement with the cradle or frame containing the battery, above the center of gravity of the frame and of the battery, and permit free lateral oscillation and vertical movement, while neutralizing vibratory and twisting movements in the truck frame and preventing them from being communicated to the battery frame and the battery.

Having described my invention, I claim:

1. In battery supporting mechanism, the combination of a frame for holding the battery, with elastic hangers having three points of connection with said frame above the center of gravity thereof.

2. In a battery supporting mechanism, the combination of a battery holding frame having rigid rectangular members, elastic members, means for supporting said elastic members so as to permit them to oscillate, and means whereby said frame members are connected with said elastic members at points above the center of gravity of said frame.

3. In battery supporting mechanism, the combination of parallel frame members, a cross bar connecting said members, a bolt passing through said cross bar, bolts passing through parts of the respective frame members aforesaid, springs supported by the respective bolts and supporting the parts through which said bolts pass and a frame for supporting said bolts, said bolts having rocking connections with said frame last named.

4. In battery supporting mechanism, a pair of parallel bars, a cross bar extending between said parallel bars, a tension member having a rocking connection with said cross bar, a tension member having a rocking connection with each of said parallel bars, a battery frame, and means comprising a coiled spring for connecting each of said tension members with said battery frame.

5. In a battery supporting mechanism, a pair of parallel rectangular members, a cross bar connecting said members, a pair of bolts connected with corresponding corners of said members, a bolt connected with said cross bar, springs through which said members act on said bolts, and supporting mechanism with which said bolts have oscillating connections.

6. In a battery supporting mechanism, a truck frame having longitudinal bars and a downwardly bent cross bar, bolts supported by and adapted to oscillate relatively to the respective bars, a cradle comprising parallel frame members, a downwardly bent cross bar connecting corners of said frame members in the plane of said cross bar first named, a spring connecting said cross bar last named and the bolt supported by the cross bar first named, and springs respectively connecting two corners of said cradle (opposite corners connected by its cross bar) with bolts supported by said longitudinal bars.

In witness whereof I have hereunto set my name this sixteenth day of January, A. D. 1909, in the presence of the subscribing witnesses.

TRACY V. BUCKWALTER.

Witnesses:
ROBERT JAMES EARLEY,
JOS. G. DENNY, Jr.